United States Patent

Fujita et al.

Patent Number: 5,482,685
Date of Patent: Jan. 9, 1996

[54] DEODORIZING APPARATUS

[75] Inventors: Tatsuo Fujita, Osaka; Syuzo Tokumitsu, Kawanishi; Hirofumi Nishida, Osaka; Tadashi Suzuki, Kashiba; Yukiyoshi Ono, Hirakata; Tetsuo Terashima, Neyagawa; Takeshi Tomizawa, Ikoma; Jiro Suzuki, Nara; Syuji Asada, Youkaichi; Yukiyoshi Nishikori, Oumihachiman, all of Japan

[73] Assignee: Matsushita Electric Industrial Co., Ltd., Osaka, Japan

[21] Appl. No.: 225,808

[22] Filed: Apr. 11, 1994

[30] Foreign Application Priority Data

Apr. 12, 1993 [JP] Japan ................................ 5-084257
Jul. 30, 1993 [JP] Japan ................................ 5-189673

[51] Int. Cl.⁶ .................................................. F01N 3/10
[52] U.S. Cl. .................. 422/174; 422/173; 422/177; 422/179; 422/180; 422/198; 422/199; 422/211; 422/221; 422/222; 422/307; 55/267; 392/485; 392/487; 392/488; 392/489
[58] Field of Search ................................ 422/171, 307, 422/173–175, 177–181, 198–199, 211, 221, 222; 392/479–485, 487–489; 55/267

[56] References Cited

U.S. PATENT DOCUMENTS

| | | | |
|---|---|---|---|
| 3,251,173 | 5/1966 | Ehlers et al. | 392/485 |
| 3,768,982 | 10/1973 | Kitzner et al. | 422/174 |
| 3,770,389 | 10/1973 | Kitzner et al. | 422/174 |
| 3,979,193 | 9/1976 | Sikich | 422/174 |
| 4,213,947 | 7/1980 | Fremont et al. | 423/245 |
| 4,416,674 | 11/1983 | McMahon et al. | 422/179 |
| 4,455,281 | 6/1984 | Ishida et al. | 422/171 |
| 4,455,474 | 6/1984 | Jameson et al. | 392/480 |
| 4,556,543 | 12/1985 | Mochida et al. | 422/179 |
| 4,825,043 | 4/1989 | Knauss | 392/482 |
| 5,084,080 | 1/1992 | Hirase et al. | 422/174 |
| 5,177,961 | 1/1993 | Whittenberger | 422/174 |
| 5,212,763 | 5/1993 | Arold et al. | 392/488 |
| 5,262,131 | 11/1993 | Bayer et al. | 422/175 |

FOREIGN PATENT DOCUMENTS

| | | |
|---|---|---|
| 0170567 | 2/1986 | European Pat. Off. . |
| 2357297 | 2/1978 | France . |
| WO90/05577 | 5/1990 | WIPO . |

*Primary Examiner*—Robert J. Warden
*Assistant Examiner*—Hien Tran
*Attorney, Agent, or Firm*—Willian Brinks Hofer Gilson & Lione

[57] ABSTRACT

A catalyst 1 is provided in a gas passage 4 for communicating between a gas flow-in unit 12 and a gas flow-out unit 13, and the catalyst 1 is heated by a heater 2, and a temperature sensor 3 for detecting the temperature of the heater 2 is provided inside the heater 2. By feeding power to the heater 2, the wall temperature of the heater 2 is raised to heat the catalyst 1, and then malodorous gas containing odor substances is passed in from the gas flow-in unit 12. The malodorous gas passes through the catalyst 1 in the gas passage 4 to be oxidized to be harmless and odorless, and is discharged from the gas flow-out unit 13.

2 Claims, 3 Drawing Sheets

DEODORIZING APPARATUS

FIELD OF THE INVENTION

The present invention relates to a deodorizing apparatus for oxidizing malodorous gas by using a catalyst to make the gas harmless and odorless.

BACKGROUND OF THE INVENTION

The deodorizing apparatus for oxidizing malodorous gas generated when drying and treating refuse such as domestic kitchen waste to make the gas harmless and odorless has been widely realized recently.

The catalyst used in such a deodorizing apparatus includes noble metals such as platinum and palladium, heavy metal compounds such as manganese, and compound oxides such as perovskite, which are used by processing into pellets, mat, net, honeycomb or the like, and when handling reaction products in gas form, the honeycomb type is widely used because of its low ventilation resistance and large mechanical strength.

These catalysts are low in reactivity at ordinary temperature, and in order to enhance the reactivity of catalysts, the malodorous gas temperature or catalyst temperature must be raised over 200° C. As the constitution of the heater for heating the catalyst, generally, the circumference of the exhaust passage carrying the honeycomb catalyst or the like was heated by the heater from outside, or the malodorous gas was preliminarily heated before feeding into the catalyst.

When the temperature of the malodorous gas getting into the catalyst is low, it is required to enhance the insulation performance in a simple constitution in order to heat the malodorous gas near the catalyst or the catalyst itself to over 200° C. so as to obtain a favorable reactivity.

To heat the malodorous gas near the catalyst or the catalyst itself to high temperature, the wall temperature of the heater must be raised, and in particular since there is a close correlation between the wall temperature and life of the heater, the wall temperature of the heater must be detected at high precision in order to extend the life.

Moreover, when the deodorizing apparatus is used in an indoor refuse treating system, a perfect odor enclosure is required aside from safety. By reducing the pressure loss at the catalyst, the reactivity of the catalyst must be enhanced.

SUMMARY OF THE INVENTION

It is hence a first object of the invention to present a deodorizing apparatus of excellent insulating performance and low pressure loss, and capable of holding a catalyst in a simple constitution, and also a deodorizing apparatus extended in the life of heater and capable of controlling the temperature accurately.

To achieve the above object, the invention comprises a gas flow-in unit, a gas flow-out unit, a gas passage for communicating between the gas flow-in unit or inlet and gas flow-out unit or outlet, a catalyst positioned in the gas passage, a heater for heating the catalyst, and a temperature sensor for detecting the temperature of the heater.

Or, the temperature sensor for detecting the temperature of the heater is provided inside the heater.

In this constitution, by feeding power to the heater and raising the wall temperature of the heater to heat the catalyst, the malodorous gas containing malodor components is passed into the deodorizing apparatus through the gas flow-in unit. The malodorous gas passes through the catalyst in the gas passage, and is oxidized to be harmless and odorless, and is exhausted from the gas flow-out unit, thereby realizing a high-performance deodorizing apparatus.

Besides, by installing the temperature sensor in the heater, the temperature can be controlled at high precision and excellent response, while the temperature of the heater is not raised locally so that the life of the heater is extended. Moreover, by installing the temperature sensor at the position for detecting the highest temperature, the safety may be guaranteed most effectively. Further, by controlling the temperature so that the temperature sensor for detecting the temperature of the heater may be at a specific temperature suited to catalytic reaction, by understanding the correlation between the wall temperature of the heater and the temperature near the catalyst, the control system can be simplified as the deodorizing apparatus. The temperature near the catalyst may be set over the temperature suited to catalytic reaction, so that the allowable margin of set temperature may be wide.

DESCRIPTION OF THE PREFERRED EMBODIMENTS

Figure 1:
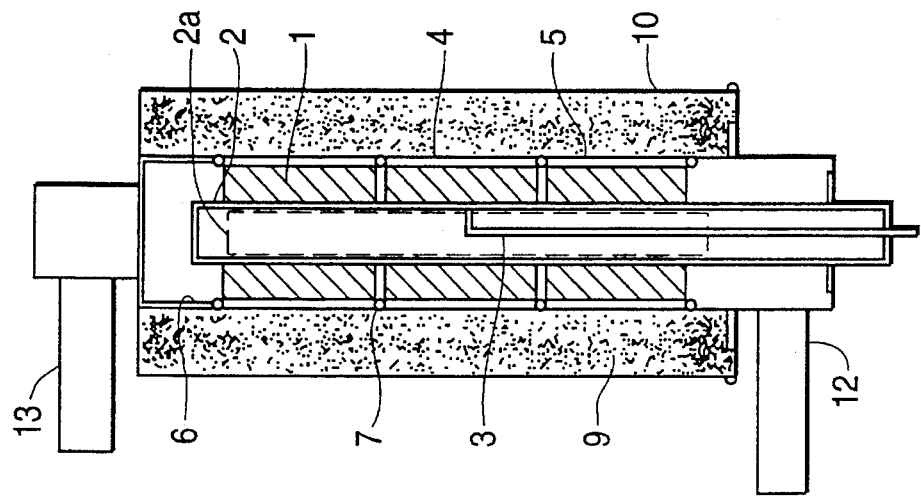
FIG. 1 is a sectional view of a deodorizing apparatus in a first embodiment of the invention.

The first embodiment of the invention is described below by reference to FIG. 1.

As shown in the drawing, a catalyst 1 is formed by carrying a platinum group noble metal on the surface of a honeycomb carrier composed of cordierite ceramic.

The catalyst 1 is almost tubular, and a bar heater 2 penetrates through the center of the catalyst 1, and the heater 2 is designed to generate heat by a heating element 2a. A temperature sensor 3 is disposed inside the heater 2, and detects the temperature of the heater 2. In this embodiment, an electric heater is used as the heater 2, but the heating source is not particularly defined.

In a gas passage 4, a catalyst holder 5 is inserted to fix the catalyst 1. This gas passage 4 is formed like a pipe, and in its lower part (upstream side), a protrusion 6 is provided as fixing means for positioning the catalyst 1.

The catalyst 1 is divided into a plurality of catalyst portions and positioned in the gas passage 4, and telescopic C-ring spacers 7 are provided among individual catalysts 1 to provide a gap. Two flanges 8 are joined to the outer circumference of the gas passage 4, and an insulator 9 is installed between the two flanges 8, and an insulator holder 10 for fixing the insulator 9 is provided.

The insulator holder 10 is a combination of two identical members having a protrusion 10a and an insertion hole 10b. A temperature fuse (overheat preventive device) 11 is installed in the flange 8.

Near both ends of the gas passage 4 formed by pipe, a gas flow-in unit or inlet 12 and a gas flow-out unit or outlet 13 are set at the lower side and upper side, respectively, so as to communicate nearly vertically, and a gas passage lid 14 is provided at the downstream side end of the gas passage 4, and a heater fixing unit 15 is disposed at the upstream side end of the gas passage 4.

In this constitution, the operation is described below. First, the heater 2 is turned on and the wall temperature of the heater 2 is raised to heat the catalyst 1. The bar heater 2 is penetrated in the center of the catalyst 1 to heat the catalyst 1 from inside, thereby reducing the heat radiation loss to transmit the radiation heat of the heater 2 effectively to the catalyst 1, and moreover since the temperature is detected by installing the temperature sensor 3 in the heater 2, the temperature is controlled at high precision and excellent response.

Moreover, by using a plurality of catalysts 1 and press-fitting telescopic C-ring spacers 7 among the catalysts 1, the plural catalysts 1 can be positioned in a simple constitution. Gaps are formed among the catalysts 1 by the spacer 7, and the malodorous gas passing through the catalysts 1 is disturbed in the gaps to be turbulent, and therefore the convection heat conduction characteristic from the catalysts 1 to the malodorous gas is enhanced, so that the heating efficiency is also improved.

After the catalysts 1 are heated, the malodorous gas is introduced from the gas flow-in unit 12 into the deodorizing apparatus. As the malodorous gas passes through the catalysts 1 in the gas passage 4, it is heated by the convection heat conduction from the surface of the catalysts 1, and is oxidized to be harmless and odorless, and is exhausted from the gas flow-out unit 13.

Herein, by disposing the gas passage 4 nearly vertically, positioning the gas flow-in unit 12 at the lower side and the gas flow-out unit 13 at the upper side, the natural convection (draft) is utilized, so that the pressure loss from the gas flow-in unit 12 at the lower side to the gas flow-out unit 13 at the upper side can be effectively decreased.

Besides, since the temperature sensor 3 is provided inside the heater 2, effects of ambient temperature can be eliminated, and the temperature detection precision of the heater 2 can be enhanced, and without local elevation of temperature of the heater 2, the life of the heater 2 can be extended.

By forming the gas passage 4 like a pipe and communicating the gas flow-in unit 12 and gas flow-out unlit 13 near both ends of the gas passage 4, the structure is simple, and the dimensional precision of roundness and cylindricity of the gas passage 4 is excellent, and the retaining property of the catalyst 1 may be enhanced.

By the protrusion 6 provided at specified position in the gas passage 4, the catalyst 1 can be positioned easily when assembling, and it is not necessary to employ an additional member for positioning the catalyst 1.

Between the gas flow-in unit 12 and gas flow-out unit 13, two flanges 8 joining the outer surface of the gas passage 4 are positioned, and the insulator 9 is placed between the two flanges 8, and also the insulator holder 10 for fixing the insulator 9 is provided, so that the insulating performance may be enhanced in a simple constitution. In particular, to heat the catalyst 1 or the malodorous gas near the catalyst over 200° C. the radiation heat loss can be reduced, and the heat may be effectively transmitted from the heater 2 to the catalyst 1. As the insulator holder 10, by combining two identical members having protrusion 10a and insertion hole 10b, the cost can be lowered.

Since the flanges 8 are joined to the gas passage 4, by installing a thermal fuse (overheat preventive device) 11 in the flanges 8, the response precision is enhanced, and the safety against fire or the like may be guaranteed.

Figure 2:
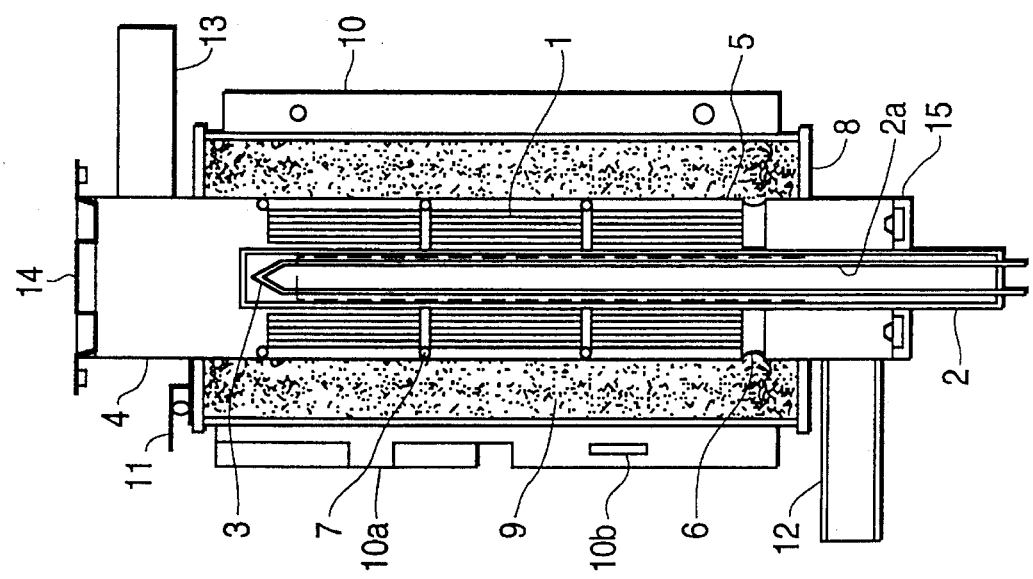
FIG. 2 is a sectional view of a deodorizing apparatus in a second embodiment of the invention.

In this embodiment, the temperature sensor 3 is provided in the heater 2, but it may be also installed in direct contact with the inside of the wall of the heater 2 as shown in FIG. 2. It realizes temperature control of high precision and excellent response. When overheated, the maximum temperature of the heater 2 can be detected, so that the safety is guaranteed most effectively. Moreover, since the temperature sensor 3 and heater 2 can be integrated without installing them separately, the constitution of the deodorizing apparatus can be simplified.

Incidentally, in the embodiment, the protrusion 6 is provided below (at the upstream side of) the gas passage 4, but the place of installation and shape are not specified as far as the catalyst 1 can be positioned. For example, positioning may be done easily by providing a ring 6 as shown in FIG. 2.

Figure 3:
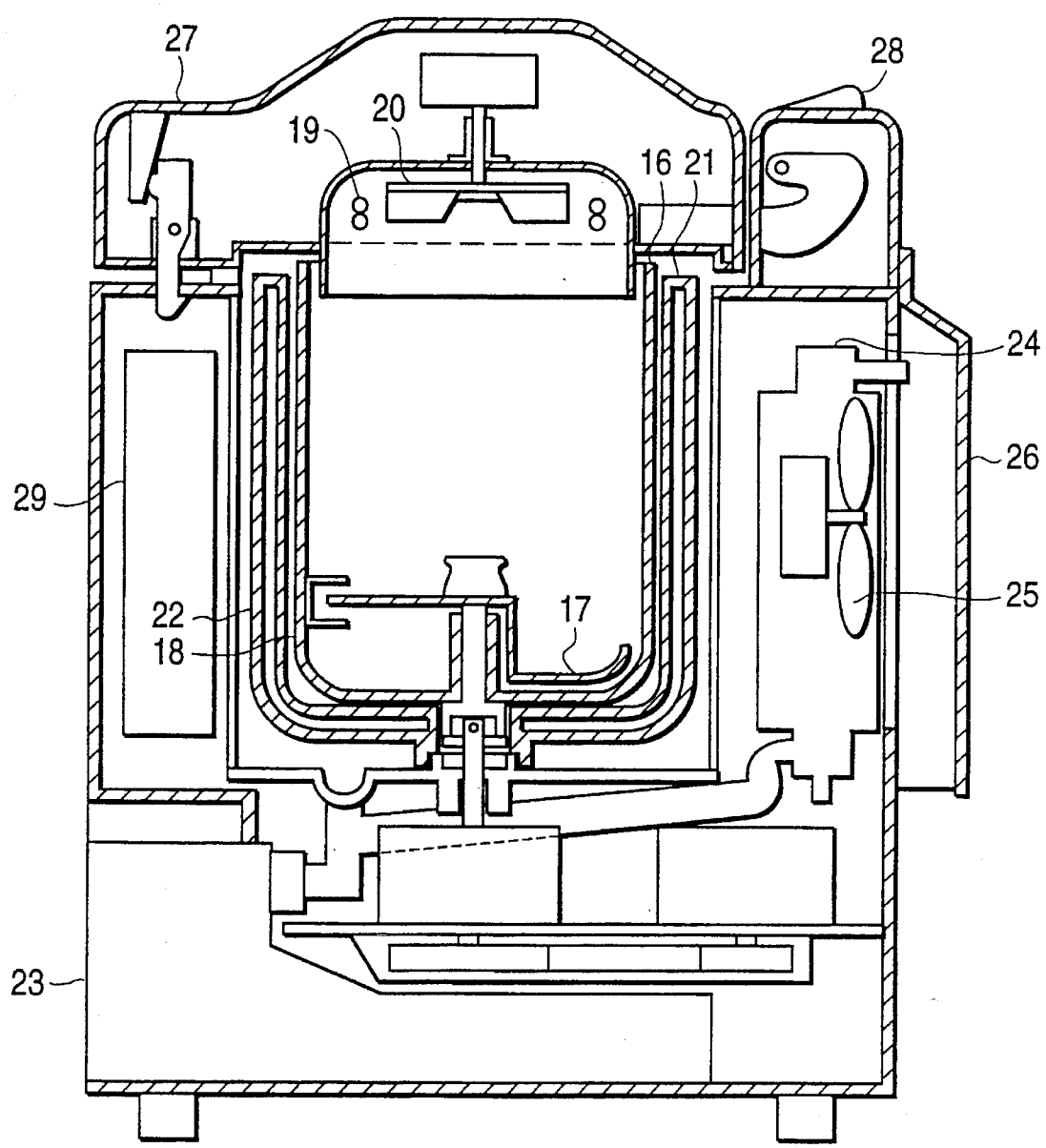
FIG. 3 is a sectional view of a refuse treating apparatus incorporating the deodorizing apparatus.

A refuse treating apparatus incorporating such deodorizing apparatus is described below while referring to FIG. 3.

As shown in the drawing, an inner container 16 is for storing refuse, and a rotary blade 17 and a stationary blade 18 are provided inside, and a drying heater 19 and a drying fan 20 are installed above the inner container 16. The inner container 16 is a vessel for containing the refuse to be dried and treated, and it is preferred to be detachable and portable by attaching a handle (not shown) or the like to its upper part. Besides, to prevent the refuse or the waste after drying process from sticking, the inner surface of the inner container 16 is desired to have stick preventive treatment such as fluororesin coating or the like.

Outside of the inner container 16 are provided an insulated container 21 and an outer container 22. As the insulated container 21, a vacuum insulated container having a vacuum inside is effective, but the inside may be sealed with insulating material or the insulating action may be realized by the material (synthetic resin, etc.) of the insulated container 21.

At the downstream side of the outer container 22, a condensing container 23 and a deodorizing apparatus 24 are provided. For cooling the outer container 22, a cooling fan 25 is provided, and an exhaust hood 26 is installed at the outlet of cooling air. The drying heater 19 and drying fan 20 are built in a lid 27. Near the lid 27 is provided an operation unit 28. Near the outer container 22 is provided a control unit 29. Steam gas containing odor released from the outer container 22 gets into the deodorizing apparatus 24, and therefore the temperature of the catalyst in the deodorizing apparatus 24 is heated approximately over 350° C. beforehand. The outlet of the deodorizing apparatus 24 confronts the exhaust hood 26.

In this constitution, the operation is described below. When the refuse is heated by operating the drying heater 19 and drying fan 20, steam is generated from the refuse, and the generated steam moves from the inner container 16 to the outer container 22. Since the outer container 22 is cooled by the cooling fan 25, the steam is condensed on the inner wall of the outer container 22, and is collected in the condensing container 23. The remaining steam containing odor moves to the deodorizing apparatus 24, and is oxidized and deodorized, and is exhausted from the exhaust hood 26. Since the outlet of the deodorizing apparatus 24 is facing the exhaust hood 26, if sulfur oxides or chlorine compounds that are hard to treat by the catalyst 1 are discharged from the deodorizing apparatus 24, they are discharged along the inner wall of the exhaust hood 26, so that adverse effects on the apparatus may be avoided.

A third embodiment of the invention is described below while referring to FIG. 4 and FIG. 5.

Figure 4:
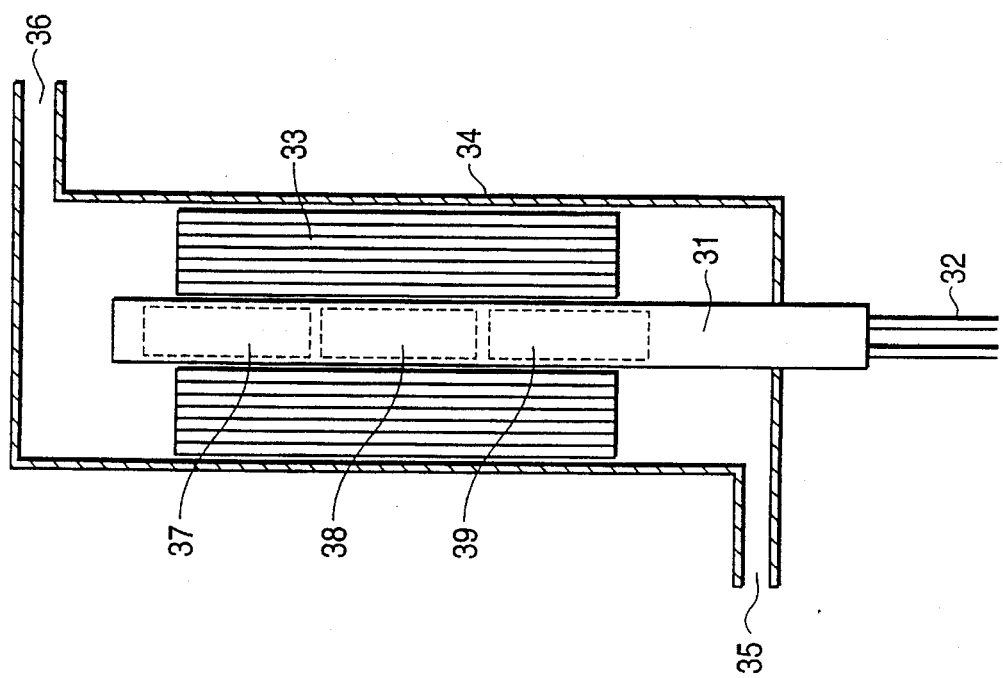
FIG. 4 is a sectional view of a deodorizing apparatus in a third embodiment of the invention.

As shown in FIG. 4, a heater 31 generates heat by the electric power supplied through a terminal 32. A catalysts 33 is a cylindrical honeycomb type, and is heated by the heater 31, and passes through a gas flow-in unit 35 and odor components of malodorous gas are oxidized and decomposed to be deodorized. The deodorized gas passes through a gas flow-out unit 36 and exhausted.

An outer tube 34 has a structure of supporting all and preventing gas leak. Reference numerals 37, 38, 39 approximately show a portion of the heater 31 near the downstream side end of the catalyst 33, a portion of the heater 31 near the center, and a portion of the heater 31 near the upstream side end, respectively.

Figure 5:
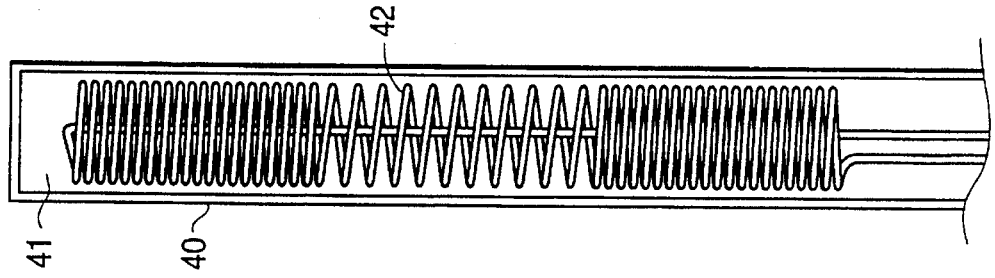
FIG. 5 is an internal structural diagram of a heater of the deodorizing apparatus.

FIG. 5 shows an internal structure of the heater 31, being composed of a pipe 40 made of stainless steel or the like, a filler 41 of magnesia or the like, and a heater wire 42 of nickel-chromium or the like.

Describing the operation in this constitution, when power is supplied from the power source through the terminal 32, the heater wire 42 in the heater 31 generates heat. At this time, as shown in FIG. 5, since the winding interval of the heater wire 42 is varied, the heat generation is large where winding is dense and small where winding is sparse. Therefore, the portion 37 of the heater 31 near the downstream side end of the catalyst 33 and the portion 39 of the heater 31 near the upstream side end of catalyst are larger in heating output per unit area than the portion 38 of the heater 31 near the center of the catalyst 33. However, comparing the surface temperature of the pipe 40 corresponding to the individual portions, considering the heat conduction, the temperature profile is close to uniform as compared with difference in heating output.

On the other hand, if the winding pitch of the heater wire 42 is made constant e.g., where the winding is either dense or sparse along the entire length of the winding, not shown in FIG. 5, the heating output is constant, and therefore the temperature distribution on the surface is high in the middle, and becomes uneven.

Practical values differ significantly depending on the size of the catalyst 33 or output and length of the heater 31, but according to the fundamental experiment for this embodiment, by the input of the same electric power, the maximum temperature on the surface of the heater 31 was raised by more than 100 degrees by making uniform, and the surface temperature of the heater 31 near the both ends of the catalyst 33 was raised by more than 120 degrees, and the degree of uniformity was notably increased.

By the heat generation of the heater 31, the catalyst 33 is heated. In this embodiment, the component of catalyst 33 is calcium aluminate carrying platinum, and its active temperature is about 200° C. although slightly different depending on odor components, and therefore the catalyst 33 must be heated at least over 200° C.

If the heating output is the same at both ends and and in the middle of the heater 31, to keep the catalyst temperature of over 200° C., a greater entire input (of electric power) is needed as compared with the embodiment in which the heating output differs between the both ends and middle of the heater 31, and the surface temperature of the heater 31 becomes extremely high.

When the surface temperature of the heater 31 is high, the durability of the pipe 40 and heater wire 42 is lowered. If the durability is maintained by lowering the input and dropping the surface maximum temperature of the heater 31, to the contrary, the temperature distribution of the catalyst becomes uneven, not reaching the active temperature in some parts, so that favorable deodorizing performance may not be expected.

That is, in the catalyst treating apparatus as in this embodiment, it is possible to present a catalyst treating apparatus of small power consumption and high durability without lowering the performance.

The catalyst 33 thus heated to have a uniform temperature distribution oxidizes, decomposes and deodorizes the malodorous gas passing through the gas flow-in unit 35, and an odorless gas is exhausted from the gas flow-out unit 36.

As mentioned above, practical values differ significantly depending on the volume of the gas to be treated, the type of the catalyst 33, or the capacity of the heater 31, and the embodiment is not intended to specify the degree of difference of heating output in the ends and middle of the heater 31 or the ratio of such range or the like, but relate to means for raising the temperature of the low temperature area of the catalyst 33 and lowering the temperature of the high temperature area on the surface of the heater 31.

What is claimed is:

1. A deodorizing apparatus for oxidizing malodorous gas comprising:

an inlet;

an outlet; and a gas passage at right angles to a direction of the inlet and the outlet for communicating between said inlet and said outlet, said gas passage including:

a catalyst positioned within said gas passage, a heater positioned within said catalyst, said heater having a portion for heating said catalyst and a portion for heating the gas passage, and a temperature sensor for detecting the temperature of said heater, said sensor positioned within said heater, wherein malodorous gas fed to said inlet and through said gas passage including said catalyst is oxidized and hence, deodorized when said catalyst is heated by said heater to a predetermined temperature as detected by said temperature sensor, and wherein said heater is constructed and arranged so that the heating output per unit area in a portion of said heater adjacent to said outlet of said gas passage is set larger than the heating output per unit area in other portions of said heater.

2. A deodorizing apparatus for oxidizing malodorous gas comprising:

an inlet;

an outlet; and a gas passage at right angles to a direction of the inlet and the outlet for communicating between said inlet and said outlet, said gas passage including:

a catalyst positioned within said gas passage, a heater positioned within said catalyst, said heater having a portion for heating said catalyst and a portion for heating the gas passage, and a temperature sensor for detecting the temperature of said heater, said sensor positioned within said heater, wherein malodorous gas fed to said inlet and through said gas passage including said catalyst is oxidized and hence, deodorized when said catalyst is heated by said heater to a predetermined temperature as detected by said temperature sensor, and wherein said heater is constructed and arranged so that the heating output per unit area at both ends of the heater is set greater than the heating output per unit area in the center of the heater.

\* \* \* \* \*